United States Patent [19]

Holtey et al.

[11] 4,379,340

[45] Apr. 5, 1983

[54] COMMUNICATIONS SUBSYSTEM IDLE LINK STATE DETECTOR

[75] Inventors: Thomas O. Holtey, Newton, Mass.; Richard P. Kelly, Nashua, N.H.; Steven S. Noyes, Boylston; James C. Raymond, Framingham, both of Mass.

[73] Assignee: Honeywell Information Systems Inc., Waltham, Mass.

[21] Appl. No.: 194,698

[22] Filed: Oct. 6, 1980

[51] Int. Cl.³ .................................................. G06F 3/04
[52] U.S. Cl. ................................. 364/900; 340/825.06; 370/79
[58] Field of Search ... 364/200 MS File, 900 MS File; 179/2 DP, 18 ES, 175.2 C; 370/79, 85, 48; 340/825.06, 825.07

[56] References Cited

U.S. PATENT DOCUMENTS

| | | | |
|---|---|---|---|
| 4,093,981 | 6/1978 | McAllister et al. | 364/200 |
| 4,168,469 | 9/1979 | Parikh et al. | 364/900 X |
| 4,225,919 | 9/1980 | Kyu et al. | 364/200 |
| 4,254,462 | 3/1981 | Raymond et al. | 364/200 |

Primary Examiner—Eddie P. Chan
Attorney, Agent, or Firm—Nicholas Prasinos

[57] ABSTRACT

A data processing system includes a communications subsystem communicating with a number of devices. A counter monitors the communication line to detect when a communication line goes idle, that is at least 15 successive binary ONE bits appear on the line for the bit oriented protocol mode. The counter advances on successive binary ONE bits and is forced to a hexadecimal ZERO in response to a binary ZERO. If the counter reaches a count of hexadecimal F (decimal 15) a carry signal from the counter prevents the counter from advancing and initiates an idle link state.

5 Claims, 3 Drawing Figures

- - - CONTROL

COMMUNICATIONS SUBSYSTEM IDLE LINK STATE DETECTOR

BACKGROUND OF THE INVENTION

1. Field of the Invention

The invention relates to data processing systems in general and more particularly to the detection of the idle link state in a communications subsystem.

2. Description of the Prior Art

Highly flexible and cost effective communications subsystems have been provided for coupling data processing systems to communication channels, such as those associated with a publicly accessible (e.g. telephone) communications network. Such systems have been embodied in hardware/firmware architectures which respond to commands from a communication processor associated with a central processing unit and enter into either a receive mode, a transmit mode, or concurrent transmit/receive modes for transferring data messages between the communication processor and the communication channel. Data transfers occur under the control of a firmware system acting in concert with a microprocessor within the adapter to assemble and disassemble whole or partial data bytes of varying bit sizes. System architectures which have been used readily accommodate an expansion of capacity and exhibit dynamic flexibility.

However, present communication line adapter systems are not able to provide the control functions required for interfacing with a synchronous communications network such as, for example, has been specified by the International Telegraph and Telephone Consultative Committee (CCITT) and described in the "CCITT Sixth Plenary Assembly-Orange Book, Vol. VIII.2 Public Data Networks", published in 1977 by the International Telecommunication Union, Geneva. Various specifications, in particular those designated X.21, X.24 and X.27 promulgated by the CCITT call for generation within the data network of bit and byte timing signals which are used for establishing a byte control protocol (BCP) or a bit oriented protocol (BOP) for organizing and handling data messages.

In a communication environment such as X.21, it is necessary to use different types of protocols (i.e., byte control protocol and bit oriented protocol) in order to send and/or receive messages with other data communication equipment. During the bit oriented protocol, the input line is said to be in an idle state when 15 or more consecutive binary ONE bits are received by the communications controller. This is not the case with the byte control protocol. The prior art such as described in U.S. application Ser. No. 53,110 entitled, "Communication Line Adapter for a Bit and Byte Synchronized Data Network" now abandoned, and U.S. application Ser. No. 911,635 entitled "Hardware/Firmware Communication Line Adapter", now U.S. Pat. No. 4,254,462, having the same assignee as the instant application, describe a system whereby the idle link state is controlled through software and firmware routines.

The prior art used a counter which operated under hardware and firmware control during the bit oriented protocol to monitor data received from the external communication devices and report the idle link state. Communication software then took appropriate action such as terminating the operation of the communication line or sending commands to re-establish the communication link.

With the advent of new communication procedures such as X.21, which use a combination of both bit oriented and byte control procedures, the requirement for firmware/software monitoring of the data resulted in excessive subsystem overhead thereby limiting the throughput of the communications subsystems.

OBJECTS OF THE INVENTION

It is an object of the present invention to provide an improved communications subsystem.

Another object is to provide improved apparatus for detecting the idle link state.

A further object is to provide improved apparatus for being responsive to the bit oriented protocol for detecting the idle link state.

Still a further object is to provide improved apparatus for monitoring both the bit oriented protocol and the byte control protocol for detecting the idle link state.

SUMMARY OF THE INVENTION

A data processing system includes a central processor subsystem, a memory subsystem and a communications subsystem, all coupled in common to a system bus. The communications subsystem includes a communications controller and a number of devices communicating with the communications controller. The communications controller receives a stream of serial data bits from a device over a data signal line and a stream of serial clock pulses over a clock signal line. The data bits and clock pulses received by a Universal Synchronous Receiver Transmitter (USRT) where the clock pulses gate the data bits and assemble bytes of information.

A counter counts the number of successive binary ONE pulses received by the USRT. Fifteen successive binary ONE data pulses received by the counter indicate that the communication is idle, that is, in an idle link state.

The counter counts the number of data pulses by counting the number of clock pulses received with accompanying binary ONE data bits. A data bit at binary ZERO forces the counter to hexadecimal ZERO. If the counter receives 15 successive data bits, then the carry signal from the counter freezes the counter at 15 with the carry signal at logical ONE.

A register stores information indicating the status of a USRT and the communication channel associated with the USRT. The information stored indicates a maintenance mode, a bit oriented protocol or a byte control protocol, enable receive transmission mode, reset idle link state and block interrupt request.

The counter is disabled in the receive transmission mode when receiving byte control protocol information. The counter is also disabled in the maintenance mode. The counter is enabled for bit oriented protocol information.

A microprocessor intercept request is made when the USRT has assembled a byte of information, the USRT stores status information, or the counter indicates a carry and block intercept request is inactive.

The microprocessor senses the intercept request and activates a multiplexer to receive signals indicating if the USRT has assembled a byte of information, the USRT is storing a status byte or the idle link state is set. Upon receiving the idle link state signal, the microprocessor loads the register with reset idle link state bit which resets the counter.

DESCRIPTION OF THE PREFERRED EMBODIMENT

Figure 1:
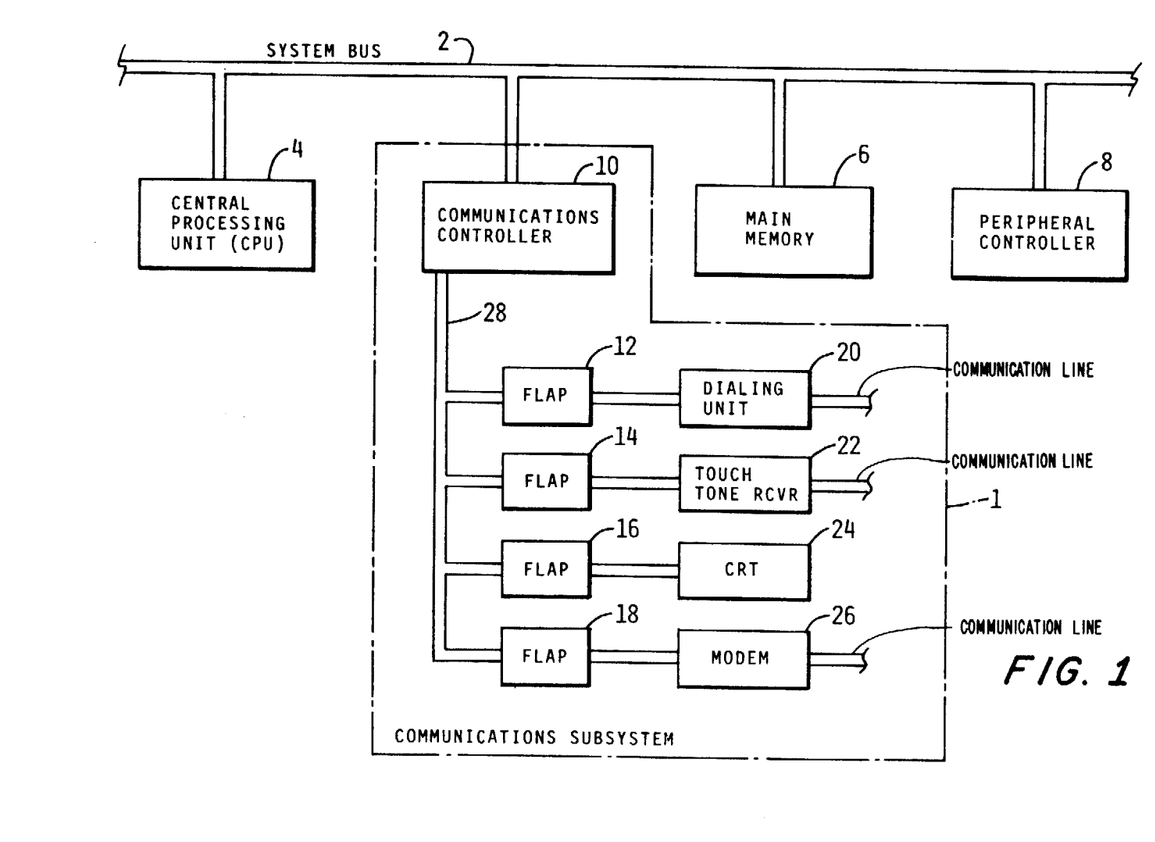
FIG. 1 is a block diagram of the data processing system including the communications subsystem.

FIG. 1 is a block diagram of a typical system. It includes a central processor unit (CPU) 4, a main memory 6, a peripheral controller 8, and a communications controller 10, all coupled in common to a system bus 2. The communications subsystem 1 includes the communications controller 10 and a number of units coupled to the communications controller 10 by a bus 28. This includes a number of flexible line adapter packages (FLAPs) 12, 14, 16 and 18. Coupled to FLAP 12 typically, could be a dialing unit 20. Coupled to FLAP 14 typically, could be a touch-tone receiver 22. Coupled to FLAP 16 typically, could be a cathode ray tube (CRT) display 24. Coupled to FLAP 18 typically, could be a modem 26.

The communications subsystem 1 receives information from devices, typically the touch-tone receiver 22 and the modem 26, through FLAPs 14 and 18 respectively. The information is transferred over bus 28 to communications controller 10. The information is stored via system bus 2 in main memory 6.

The communications subsystem 1 sends information to devices, typically the dialing unit 20, the CRT 24 and the modem 26. The information is sent to FLAPs 12, 16 and 18 from main memory 6 via communications controller 10 and system bus 2.

The CPU 4 has overall control of the communications subsystem 1 execution and performance. The CPU 4 accomplishes this by transferring configuration and control information via system bus 2 for storage in the communications controller 10. This information includes channel control programs (CCP), communication control blocks (CCB), and line control tables (LCT).

Figure 2:
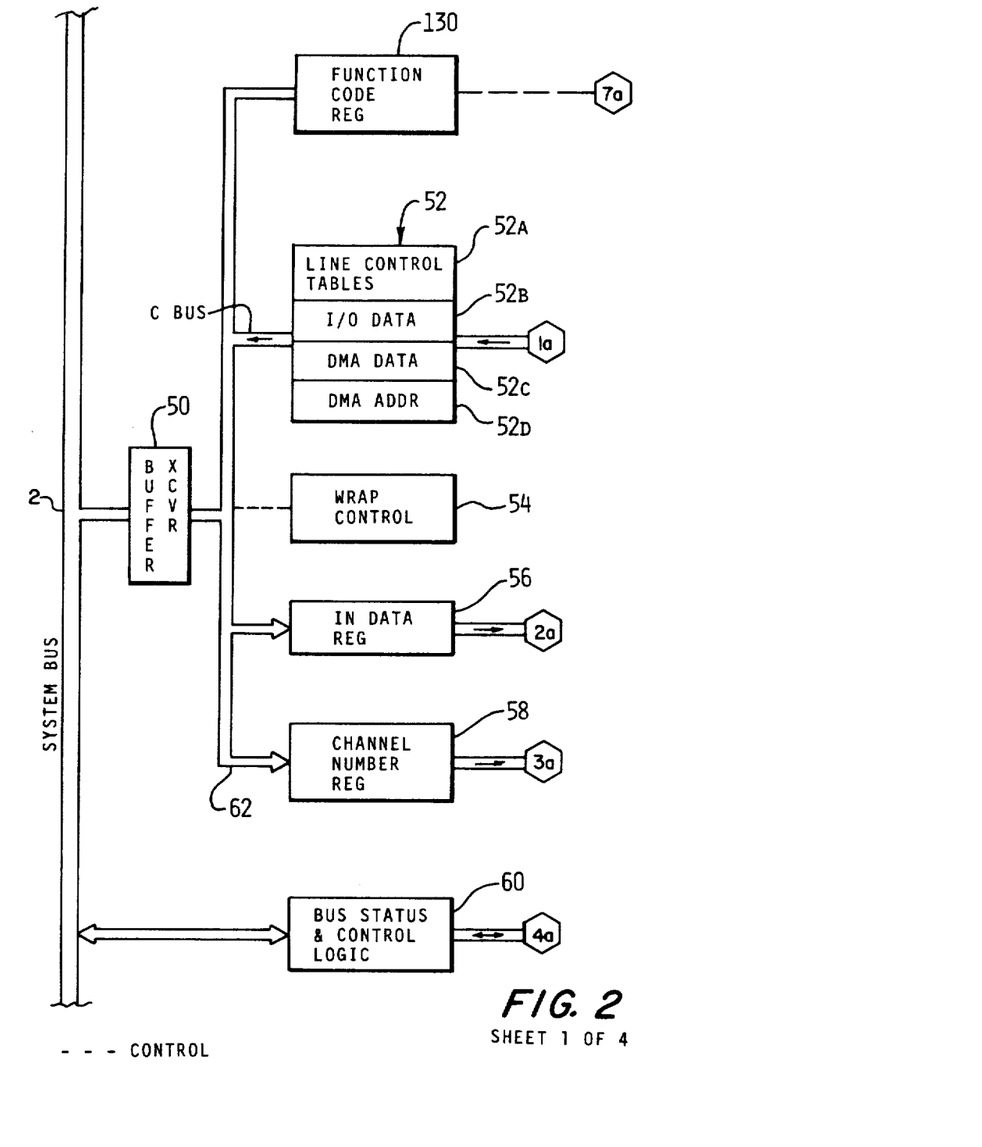
FIG. 2 is a block diagram of the communications subsystem.

FIG. 2 shows a block diagram of the communications subsystem 1 including the communications controller 10 and the FLAPs 12, 14, 16 and 18. Information is received by communications controller 10 from main memory 6 via system bus 2, a transceiver 50, C bus 62, and is stored in an in-data register 56 under control of bus and status logic 60. Bus and status logic 60 is described in U.S. application Ser. No. 8,001 filed Jan. 31, 1979 entitled, "Data Processing System Having Direct Memory Access Bus Cycle", now U.S. Pat. No. 4,293,908. Information is transferred to the system bus 2 via a random access memory (RAM) 52, C bus 62 and transceiver 50.

Information may be routed from RAM 52 to in-data register 56 since transceiver 50 is capable of isolating the C bus from system bus 2 during a wrap-around operation. RAM 52 contains four 16 bit registers, an interrupt data register 52a, an input/output data register 52b, a direct memory access (DMA) register 52c and a DMA address register 52d.

The interrupt data register 52a stores the channel number of the CPU 4 and the interrupt level of the information received by the communications subsystem 1 for transfer to main memory 6.

The CPU channel number on system bus 2 indicates that this system bus 2 cycle contains information for the CPU 4.

The input/output data register 52b stores information, status or device identification, in response to a CPU 4 input request. The DMA register 52c stores the information that is to be written into main memory 6.

The DMA address register 52d stores the main memory 6 address location into which the information stored in DMA data register 52c is to be written. The DMA address register 52d may also store the main memory 6 address location of the information requested by communications controller 10.

A channel number register 58 receives the channel number of all system bus 2 input/output cycles. The bus status and control logic 60 compares the channel number stored in manual switches with the channel number present on the system bus 2. An equal comparison indicates that this system bus 2 cycle is addressing communications subsystem 1. The channel number register 58 is then used to store the channel number present on the system bus 2. A function code register 130 stores the function code received from the system bus 2. The function code indicates to the communications subsystem 1, the input/output function the communications controller 10 is to perform.

A microprocessor 96 controls the operation of the communications controller 10. The microprocessor 96 communicates with the system bus 2 via a U bus 82, a transceiver 98, I bus 64, RAM 52 for sending data to the system bus 2; and in data register 56 for receiving data from the system bus 2, and transceiver 50. Microprocessor 96 generates address signals which are sent over an address bus 100.

Also coupled to U bus 82 are universal synchronous receive/transmit receivers USRT-2 88 and USRT-3 90 communication interfaces. Associated with USRT-2 88 is a baud rate generator BAUD-2 68 and an LR2-2 register 66. Associated with USRT-3 90 is a baud rate generator BAUD-3 69 and an LR2-3 register 67. BAUD-2 68 and BAUD-3 69 receive signals from I bus 64 to specify the baud rate for the devices directly connected to communications subsystem 1, and also indicates to USRT-2 88 and USRT-3 90 respectively the baud rate for transmission to an external device.

The LR2-2 register 66 and LR2-3 register 67 store signals from I bus 64 for controlling such operations as clear, idle link state, transmit-on, receive-on, and loop modes of USRT-2 88 and USRT-3 90 respectively.

An LR5 multiplexer 128 receives output status signals indicating transmit underrun, byte available, status available, idle link state from USRT-2 88 or USRT-3 90 for transfer to I bus 64.

Intercept data programmable read only memory (PROM) 70 is addressed by channel number signals selecting a particular communication channel in communications subsystem 1 and also addressed by signals indicating that the USRT-2 88 or the USRT-3 90 has generated a data service request. An intercept signal from PROM 70 is applied to intercept control logic 80. Microprocessor 96 queries intercept control logic 80 for the interrupt signal. Microprocessor 96 is responsive to the intercept signal to receive the remaining PROM 70 signals identifying the interrupting unit for processing the particular communication channel.

A channel register 74 is associated with the paging operation which is described infra. Channel register 74 is loaded by microprocessor 96 through U bus 82, transceiver 98, and I bus 64 with information indicating which communication channel is operative. Signals CPGCNL+00 and CPGCNH+00 are provided to the strobe generator and control register 102 for generating FLAP strobes and storing the direct connect, clear to send and protocol modes of operation.

A random access memory (RAM) 118 stores channel control programs (CCP), communication control blocks (CCB) and line control tables (LCT). This information is loaded into RAM 118 from main memory 6, via system bus 2, transceiver 50, C bus 62, in data register 58, I bus 64, transceiver 98, U bus 83, a transceiver 108, an M bus 110 to RAM 118. This is accomplished by microprocessor 96 generating appropriate address locations which are transferred to RAM 118 via address bus 100 and paging logic 116.

The communications controller 10 continually scans the communication lines from FLAPs 12, 14, 16 and 18 for any activity. Upon detection of a receive channel activity, the receive CCP for that channel is initiated. Under CCP control the communications controller 10 analyzes the assembled receive data byte, performs any required checks, updates the LCT status and CCB control progress, and delivers the data byte to main memory 6. The CCP terminates after each completed transfer to main memory 4, or when interrupted by a higher priority channel.

The CCB area of RAM 118 provides information on each communication line in a transmit mode and each communication line in a receive mode. The information includes a main memory 6 address location of the next data byte to be stored or read. The information further includes a count of the number of bytes remaining for transfer between the communications controller 10 and main memory 6, and the final status of the communication line. The final status includes error information, data set status (e.g. modem 26), interrupt status, and whether the CCB program has been executed and the status is complete.

The LCT area of RAM 118 stores receive and transmit configuration, context and control information for each communication line. Included are firmware work locations, CCP work locations, receive transmit character length information, a CCP pointer, data byte storage, status information and interrupt level information.

A CCB active register 76 stores information indicating which of the four communication lines is active, and whether the communication line is in a receive or transmit mode. The output of the CCB active register 76 is available to the microprocessor 96 through the paging logic 116.

An S register 78 allows the microprocessor 96 to perform an indirect addressing function by storing an address in the S register 78. This address replaces an address stored in a PROM 126 address location.

PROM 126 stores the firmware routines which are operative with the microprocessor 96. Address information is sent from microprocessor 96 to PROM 126 via address bus 100 and paging logic 116. A microword read from PROM 126 is sent back to the microprocessor 96 via the M bus 110, transceiver 108 and U bus 82.

The microprocessor 96 communicates with the CPU 4 and the main memory 6 over system bus 2 as well as the USRT-2 88 and USRT-3 90 through the firmware routines stored in PROM 126 and the software channel program routines stored in RAM 118.

It is necessary to match the speed of microprocessor 96 with the speed of the logic and memory units. This is accomplished through a clock logic 94 unit. The microprocessor 96 normally runs at a 500 nanosecond or two megahertz clock rate. However, when the microprocessor 96 communicates with the USRT-2 88 and USRT-3 90 or FLAP 122a, 122b, 122c or 122d logic, the clock logic 94 phase 1 and phase 2 timing signals are slowed to a 1600 nanosecond or 0.625 megahertz clock rate. The clock logic 94 outputs a number of clock phase signals in each microprocessor 96 phase 1 and phase 2 cycles. The phase 1 and phase 2 cycles are stretched to enable additional clock phase signals to control the FLAP 122 a-d logic.

When USRT-2 88 is in a transmit (bit oriented protocol) mode, and the next data byte is not provided to the USRT-2 88 in time to provide a continuous stream of bits to the receiving station, then a transmit underrun unit 92 conditions the USRT-2 88 to transmit a series of binary ONEs indicating to the receiving station that the message was aborted. The data bytes are sent to a device via serial FLAP interface logic 106 and a FLAP line interface 124c and 124d.

An idle link state unit 93 is also coupled to the USRT-2 88. When the USRT-2 88 is in a receive (bit oriented protocol) mode, the sending station places the line in an idle state by sending 15 binary ONE bits on the line. The idle link state unit 93 detects the 15 binary ONE bits and informs the microprocessor 96 that the line is in an idle link state via LR5 MUX 128. The microprocessor 96 responds to the 15 successive binary ONE bits to abort the message sent by the sending station and look for a new message.

A transmit underrun unit 85 and an idle link state unit 86 are coupled to USRT-3 90 to perform the transmit underrun operation and receive idle link state operation for that communication channel.

An address decode 114 unit receives address signals from the microprocessor 96 via address bus 100 and generates control signals which perform a number of functions, typically activating the stretch cycle of clock logic 94, enabling certain registers to store information from the various buses, enabling a strobe generator and control register logic 102 by means of signal CPGFLP-00, and enabling USRT-2 88 and USRT-3 90.

The strobe generator and control register logic 102 is responsive to address signals received over address bus 100 for generating separate strobe signals for FLAP registers 122a, 122b, 122c and 122d as well as control signals which are enabled at the respective FLAP registers 122a-d by the particular strobe signal. Stored are bits indicating the direct connect, clear to send and protocol modes of operation.

An external connector 84 is provided for testing purposes. It allows test equipment to be connected to U bus 82 to exercise the communications controller 10 through firmware test routines applied externally. PROM 126 may be disabled for certain test sequences.

A paging logic 116 unit in conjunction with the channel register 74 and the CCB active register 76 allows the microprocessor 96 to be operative with the eight communication channels using a single firmware set of routines. Associated with each communication channel is a block of CCB software. The paging logic allows the same set of firmware routines to process each CCB program. Similarly, the LCTs are organized by communication line. The paging logic 116 allows a single firmware routine to be operative with each communication line.

Data is transferred between the U bus 82 and the FLAPs 122a–d via F bus 112 and a transceiver 104.

The FLAP registers 122a–d are operative with the FLAP line interface receivers and drivers 124a, 124b, 124c and 124d for communication with devices 20, 22, 24 and 26 respectively.

Figure 3:
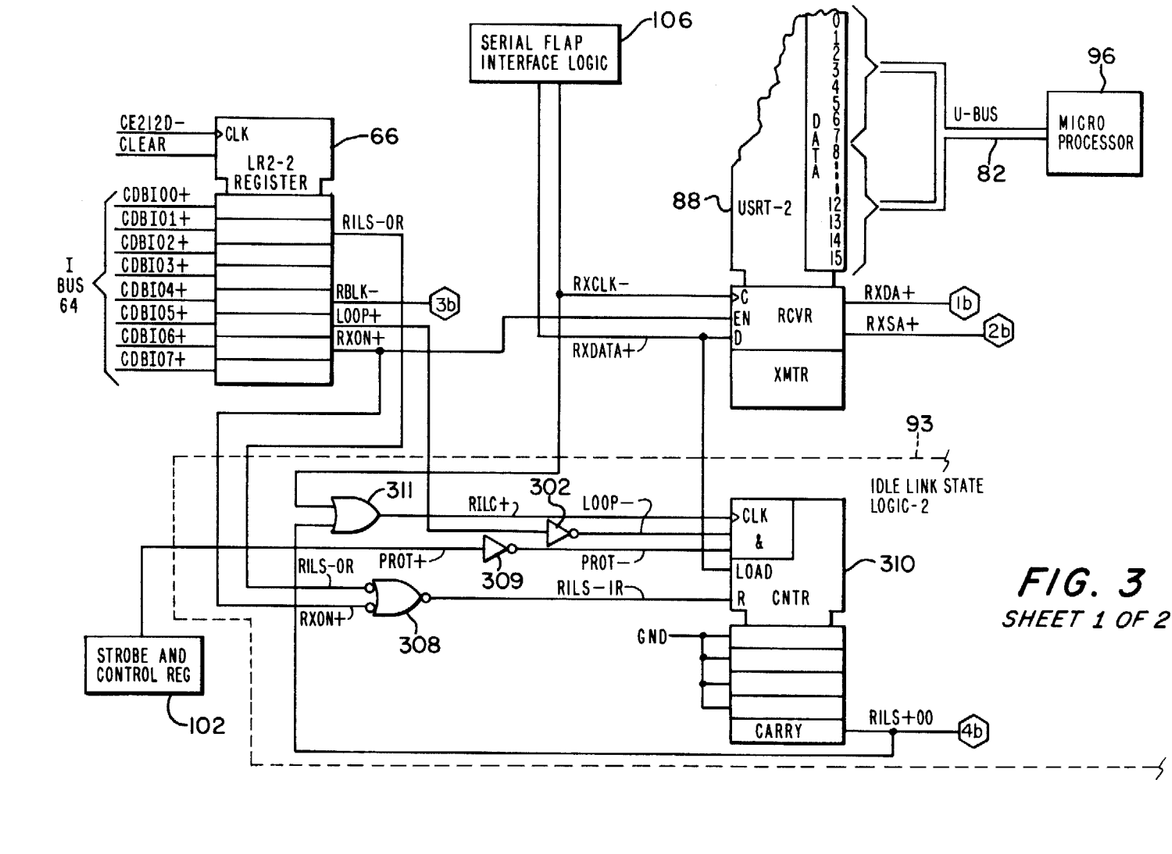
FIG. 3 is a detailed logic diagram of the idle link state logic.

The idle link state logic-93 is operative when receiving data in the bit oriented protocol (BOP) to detect 15 successive logical ONE data bits. This indicates to the communications controller 10 that the line which was operative is now idle. The idle link state logic-93 is operative when receiving data in the byte control protocol (BCP).

Related co-pending U.S. application Ser. No. 194,331 entitled, "A Communication Subsystem Having a Self Latching Data Monitor and Storage Device" describes the storing of the signal indicating the BOP or BCP data transmission mode. Protocol signal PROT+ from the strobe and control register 102 is at logical ZERO for the BOP mode.

Data signals are received by a device, typically the MODEM 26, from an external source and transmitted through the flap line interface 124d, the flap register 122d and the serial flap interface 106, FIG. 2.

In FIG. 3, the data signals are applied serially via signal RXDATA+ to the receive data input terminal of USRT-2 88 and the load terminal of an idle link state counter 310. Similarly, the receive clock signals are generated by MODEM 26 and are applied serially to serial flap interface 106 via flap line interface 124d and flap registers 122d. The serial receive clock signals RXCLK-generated by serial flap interface 106 are applied to the receive clock terminal of USRT-2 88 and in input to an OR gate 311. The output signal RILC+ is applied to the clock input terminal of counter 310. The PROT+ signal is inverted by an inverter 309, and the output signal PROT— is applied to the AND input terminal of counter 310.

The LR2-2 register 66 stores a maintenance bit which conditions output signal LOOP+. Signal LOOP+ at logical ZERO indicates this is not a maintenance mode. An inverter 302 inverts signal LOOP+ and output signal LOOP— at logical ONE is applied to the AND input terminal of counter 310. Signals LOOP— and PROT— at logical ONE condition counter 310 to count signals applied to the clock terminal.

Counter 310 stores a count of the number of successive binary ONE bits received over signal line RXDATA+ by counting the number of clock signals RILC+. When the LOAD terminal is a binary ZERO the counter input signal, in this case GND or binary ZERO, is stored in counter 310. If 15 successive binary ONE bits are received over signal line RXDATA+ then the carry output signal RILS+00 is forced to binary ONE. This signal applied to OR gate 311 prevents counter 310 from advancing.

This USRT-2 88 receives clock signals RXCLK— to sample the serial data signal RXDATA+ in order to assemble bytes for parallel transfer over U bus 82 to microprocessor 96. Signal RXDA+ is applied to an input terminal 0 of LR5 MUX 128 and the input of an OR gate 162, and is at logical ONE when the complete byte has been assembled in the USRT-2 88. Also, the output signal RXSA+ at logical ONE is applied to an OR gate 160 each time a change in the receiver status is sensed by USRT-2 88. Assembled bytes in the USRT-2 88 may detect a receive end of message, a receive overrun, a receive abort or a receive frame check sequence error condition.

LR2-2 register 66 output signal RBLK— is applied to an AND gate 164 condition microprocessor 96 intercept. The microprocessor 96 is interrupted by the USRT-2 88 when the USRT-2 88 stores a byte of information, signal RXDA+ at logical ONE, or senses a change in receiver status, signal RXSA+ at logical ONE. The microprocessor 96 is interrupted when idle link state logic-93 indicates that the USRT-2 88 received 15 successive binary ONE bits, signal RILS+00 at logical ONE. Any of these conditions forces the output of AND gate 164, signal RRQT, to logical ONE forcing a microprocessor 96 intercept sequence through the intercept data PROM 70. The use of PROM 70 is disclosed in U.S. application Ser. No. 477, filed Jan. 2, 1979, now U.S. Pat. No. 4,271,467, issued June 2, 1981, entitled, "I/O Priority Resolver" which is herein incorporated by reference.

A signal is sent from the intercept data PROM 70 to the intercept control logic 80. The microprocessor 96 receives the information stored in intercept control logic 80 on a periodic poll which indicates that a USRT is requesting an interrupt. The microprocessor 96 initiates a receive channel control program sequence to transfer the PROM output signals which identify the interrupting USRT to the active channel register 74. The microprocessor 96 then activates LR5 MUX 128 and active channel register 74 for the receive status information and the channel number respectively.

Input terminal 0 of LR5 MUX 128 is selected by signal CPGCNL+ from active channel register 74. The output of LR5 MUX 128 is active when control signal CE$DZI is forced to logical ZERO by address signals generated by microprocessor 96. The output signals signal CCOMSE+00 high. This forces strobe signal CHLSTB—00 low.

Flop 202 is set at "C" time on the rise of clock signal CTPHZC—00 since read/write signal CUREAD—10 is high. This sets output signal CCOMSE+00 low, forcing strobe signal CHLSTB—00 high. Signals indicating the selection of either a direct connect or a protocol bit are valid, as is the data bit CDBM01+W0, when clock signal CTPHZ2+1R is high during the write cycle. The data bit is strobed into the selected register of latch 200 when strobe signal CHLSTB—00 is low.

During the read cycle, when read/write signal CUREAD—10 is low, flop 202 is reset at "G" time as described supra and is set at "A" time on the fall of clock signal CTPHZ2+1R. Valid data and select signals for the clear to send bit are available when clock signal CTPHZ2+1R is high. The clear to send bit is stored in latch 200 when the strobe signal CHLSTB—00 is low.

The microprocessor 96 is a Motorola 6800 circuit described in "Basic Microprocessors and the 6800" by Ron Bishop, published by Hayden Book Co., Inc. of Rochelle Park, N.J. The USRT-2 88 and USRT-3 90 circuits are Signetics 2652 Multi-Protocol Communications circuits described in the "Signetics Bipolar/MOS Microprocessor Data Manual", copyright 1977 by Signetics Corp., 811 E. Arques Avenue, Sunnyvale, Calif. 94086.

Flop 202 is a 74 S 74 logic circuit and the latch 200 is a 74 LS 259 logic circuit as described in the TTL Data Book for Design Engineers, Second Edition, published by Texas Instruments.

Having shown and described a preferred embodiment of the invention, those skilled in the art will realize that many variations and modifications may be made to affect the described invention and still be within the scope of the claimed invention. Thus, many of the elements will provide the same results and fall within the spirit of the claimed invention. It is the intention, therefore, to limit the invention only as indicated by the scope of the claims.

What is claimed is:

1. In combination with a communication line coupled via a modem to a data processing system comprising a system bus, at least one central processing unit (CPU), one main memory system, one peripheral controller and a communications subsystem all coupled in common to a system bus, said communication subsystem including a communications controller coupled to said system bus and also including typical communications devices such as said modem, a dialing unit, a touch tone receiver, a cathode ray tube (CRT) and a universal synchronous receive transmit device (USRT) each communicating with the communications controller, said communications subsystems comprising:
  (a) a data signal line coupled to said communications controller and to said typical communication devices for transmitting a stream of said serial data bits to said USRT from said modem;
  (b) a clock signal line also coupled to said communications controller and to said typical communication devices for transmitting a stream of serial clock pulses over said clock signal line from said modem to said USRT;
  (c) counter means coupled to said data signal and clock signal lines for counting the number of successive binary one pulses received by said communications controller;
  (d) disabling means coupled to said counter means for disabling said counter means and preventing any further count when said counter counts a predetermined number of successive binary one bits, thus indicating that the communication line and the data processing system is in an idle state, means for communicating said idle state to said USRT;
  (e) a microprocessor coupled to said USRT for controlling the operations of said communications controller such as transmit and receive information;
  (f) a first PROM means coupled to said microprocessor ($\mu$P) and to said USRT for storing first signals for controlling the generation of a first intercept request signal, said first PROM means responsive to a data service request from said USRT when said USRT has assembled a byte of information from the stream of said data bits for generating said first intercept request signal;
  (g) intercept control logic means coupled to said first PROM means and to said $\mu$P for receiving and transmitting the first intercept request signal to said microprocessor; and
  (h) second PROM means in said first PROM means for storing second signals for controlling the generation of a second intercept request signals, said second PROM means only responsive to said idle state for generating said second intercept request signals, whereby said microprocessor being responsive to the first intercept request signal to receive the second intercept signals for identifying and processing the particular communication channel request associated with the interrupting USRT and to reset the counter means.

2. The subsystem as recited in claim 1 including a multiplexer coupled to said USRT, to said $\mu$P and to said intercept control logic, said multiplexer for receiving the first signals indicating that the USRT has assembled a byte of information, said multiplexer being activated by said microprocessor to perform its function when the microprocessor senses the intercept request.

3. The subsystem as recited in claim 2 including second means in said multiplexer for receiving the second signals indicating that the USRT is storing a status byte signal.

4. The subsystem as recited in claim 3 including third means in said multiplexer for receiving the second signals indicating that the USRT is storing an idle link state signal.

5. The subsystem as recited in claim 4 wherein said microprocessor reset means causes said counter means to be reset when said USRT receiving the idle link state signal.

* * * * *